United States Patent

Gagas

[11] 4,173,361
[45] Nov. 6, 1979

[54] DOWN SPOUT ADAPTOR ASSEMBLY

[76] Inventor: Stanley J. Gagas, 127 Apline Ter., Shawano, Wis. 54166

[21] Appl. No.: 878,518

[22] Filed: Feb. 17, 1978

[51] Int. Cl.² .............................................. F16L 55/00
[52] U.S. Cl. ..................... 285/64; 285/178; 285/404; 285/417; 285/424; 285/DIG. 22
[58] Field of Search ........ 285/178, DIG. 22, DIG. 4, 285/424, 397, 398, 399, 177, 175, 64, 404, 417; 61/10, 11, 14, 15; 52/12–16

[56] References Cited

U.S. PATENT DOCUMENTS

| 924,515 | 6/1909 | Weber | 285/417 X |
| 1,322,189 | 11/1919 | Holt | 52/16 X |
| 2,480,791 | 8/1949 | Valerius | 285/177 |
| 2,845,631 | 8/1958 | Kozlowski et al. | 285/178 X |
| 3,471,179 | 10/1969 | Sixt | 285/DIG. 4 |
| 3,612,409 | 10/1971 | Henning | 285/DIG. 22 |

FOREIGN PATENT DOCUMENTS

| 115809 | 11/1969 | Denmark | 285/175 |
| 1224789 | 2/1960 | France | 285/399 |
| 417387 | 1/1947 | Italy | 285/178 |
| 450680 | 4/1968 | Switzerland | 52/16 |
| 841166 | 7/1960 | United Kingdom | 52/16 |

Primary Examiner—Dave W. Arola
Attorney, Agent, or Firm—Ronald E. Barry

[57] ABSTRACT

A down spout adaptor assembly includes a down spout adaptor and a storm sewer entry adaptor, the down spout including a tapered asymmetric tube having an arcuate bead projecting outwardly around the lower end thereof, the storm sewer entry adaptor including a cylindrical structure having an arcuate bead around the upper portion thereof, the arcuate bead on the down spout adaptor being insertable into the arcuate bead on the entry adaptor.

1 Claim, 4 Drawing Figures

DOWN SPOUT ADAPTOR ASSEMBLY

BACKGROUND OF THE INVENTION

In connecting the roof gutter down spout on a house with the storm sewer pipe, it has been customary to wrap tar paper or the like around the area of juncture and to cover the same with cement or concrete. Over the years it has become apparent that this concrete connection is subject to breakage due to weather and accidental impact by foreign objects. Metal connectors have been designed which are attached to the lower end of the down spout and the lower end of the metal connectors inserted into the sewer entries. Attempts to seal the lower end of the connector to the sewer entry is difficult because of the tendency of cement or sealants to flow into the storm sewer.

SUMMARY OF THE INVENTION

The adaptor assembly according to the present invention provides a simple system for postively connecting the down spout to the sewer pipe. The down spout adaptor is provided at its upper end with a circular or rectangular configuration which corresponds to the end of the down spout. The lower or larger end of the down spout adaptor is circular and is provided with a bead that can be inserted into a corresponding bead on the sewer pipe entry adaptor. The entry adaptor is designed to seat on the upper end of the sewer pipe with the bead in engagement with the outer periphery of the sewer pipe. The adaptors are so designed that the bead within a bead arrangement cannot be easily disconnected and assures a long lasting connection without any sealant.

DRAWINGS

DESCRIPTION OF THE INVENTION

Figure 1:
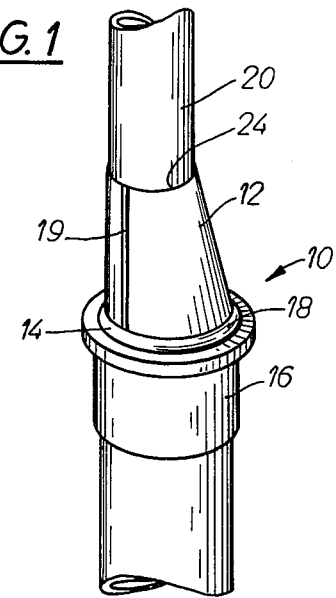
FIG. 1 is a fragmentary view in perspective of the down spout adaptor assembly showing the down spout adaptor seated within the storm sewer entry adaptor.
Figure 2:
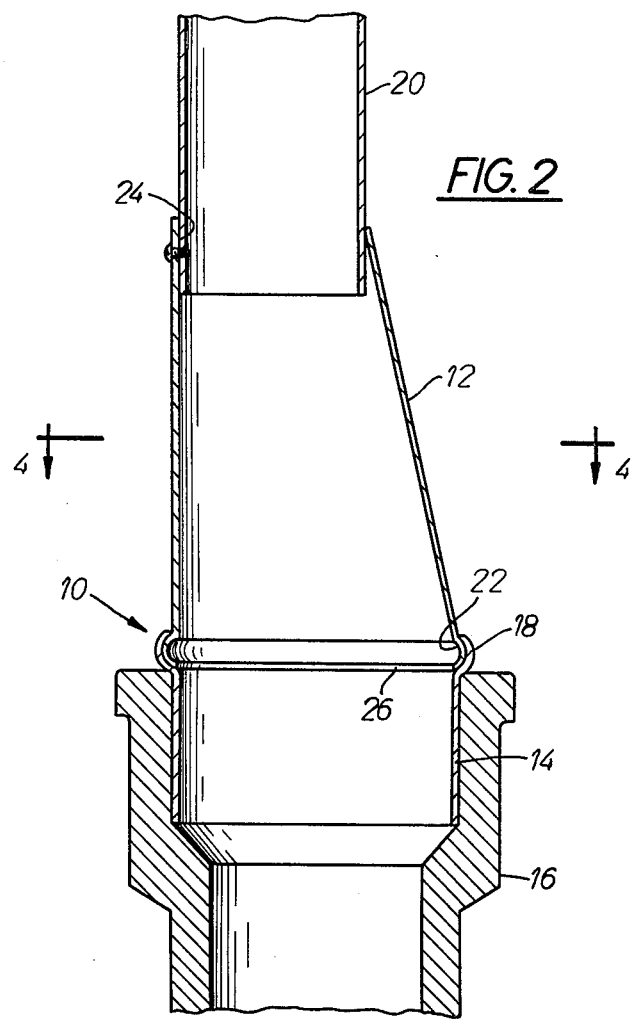
FIG. 2 is an enlarged vertical cross sectional view of the down spout adaptor and storm sewer entry adaptor with the down spout adaptor bead seated snugly in the entry adaptor bead.

Referring to FIG. 1 of the drawing, the down spout assembly 10 generally includes a down spout adaptor 12 and a storm sewer entry adaptor 14. The entry adaptor 14 is shown inserted into the open end of a storm sewer entry pipe 16 with the curved bead 18 seated on the upper edge of the entry pipe 16. The downspout adaptor 12 is shown with the upper end secured to the lower end of a down spout 20 and the lower end having a bead 22 seated within the bead 18 on the storm sewer entry adaptor 14.

More particularly, the down spout adaptor 12 is formed from a sheet of metal that is cut and formed with a seam 19 to provide a circular opening 24 at the upper end and a circular opening 26 at the lower end, the upper opening 24 being smaller than the lower opening 26 and being located in an offset or asymmetrical relationship to the opening 26. The down spout adaptor thus provides an extension of the down spout 20 and projects outwardly therefrom on one side to engage the storm sewer entry adaptor 14. The lower end of the down spout adaptor 12 is provided with an arcuate bead 22 which has an outer diameter corresponding to the inner diameter of the bead 18 on the storm sewer entry adaptor 14.

Figure 3:
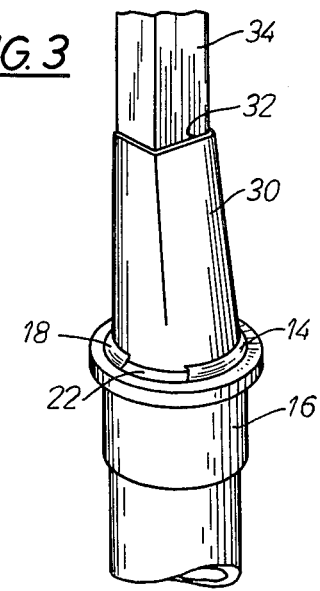
FIG. 3 is a perspective view of a modified type of down spout adaptor having a rectangular opening at the top.
Figure 4:
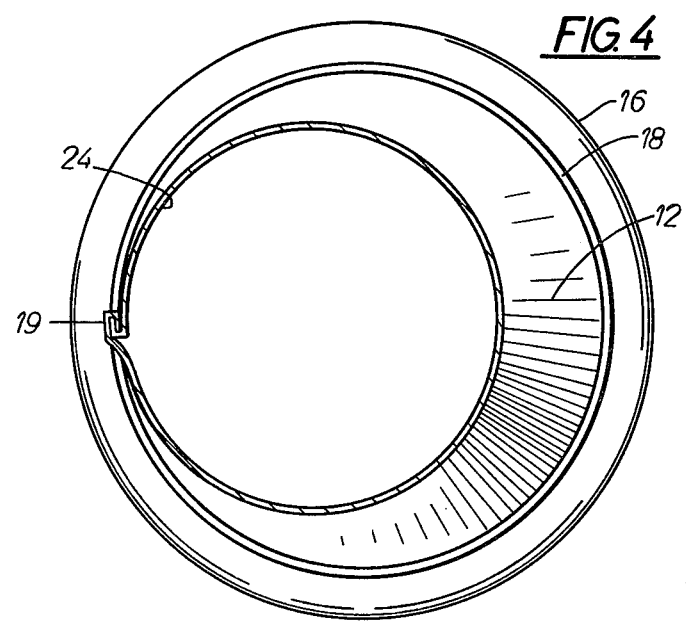
FIG. 4 is a horizontal cross sectional view taken on line 4—4 of FIG. 2 showing the asymmetric relation of the top to the bottom of the down spout adaptor.

In the embodiment of the invention shown in FIG. 3, the upper end of the down spout adaptor 30 is shown with a rectangular opening 32 which corresponds to the configuration of the rectangular down spout 34. The lower end of the down spout is provided with an opening 26 which corresponds to the opening in the sewer pipe entry 16. A bead 22 is provided on the lower end of the down spout adaptor and a bead 18 is provided on the upper end of the storm sewer entry adaptor as described above.

The embodiments of the invention in which an exclusive property or privilege is claimed are defined as follows:

1. A down spout adaptor assembly for connecting a down spout mounted on the wall of a building to a sewer pipe, said assembly comprising:

a down spout adaptor including a body portion having a first opening adapted to be connected to the lower end of the building down spout and a second opening, said body portion being tapered outwardly from said first opening toward said second opening whereby said down spout adaptor can be placed against the wall of the building, said second opening being larger then said first opening and asymmetric with respect to the flow axis of said down spout, and an entry adaptor including a cylindrical portion having an opening offset from said first opening and corresponding to said second opening and adapted to be inserted into a sewer pipe, and means connecting said body portion of said down spout adaptor to said cylindrical portion of said entry adaptor to provide a seal between said adaptors, said means including an arcuate bead around the second opening at the lower end of said body portion, and a corresponding bead around the upper edge of the corresponding opening in said cylindrical portion, said arcuate bead being engageable with the inside surface of said corresponding bead on said cylindrical portion.

* * * * *